Sept. 8, 1942.　　　E. W. BULLOCK ET AL　　　2,294,891
MACHINE FOR HARDENING GEARS
Filed Aug. 20, 1940　　　11 Sheets-Sheet 1

Inventor
E. W. BULLOCK AND J. V. FIDD
By
B. G. Schlesinger
Attorney

Sept. 8, 1942.  E. W. BULLOCK ET AL  2,294,891
MACHINE FOR HARDENING GEARS
Filed Aug. 20, 1940  11 Sheets-Sheet 6

Inventor
E.W. BULLOCK AND J.V. FIDD
By
B. F. Schlesinger
Attorney

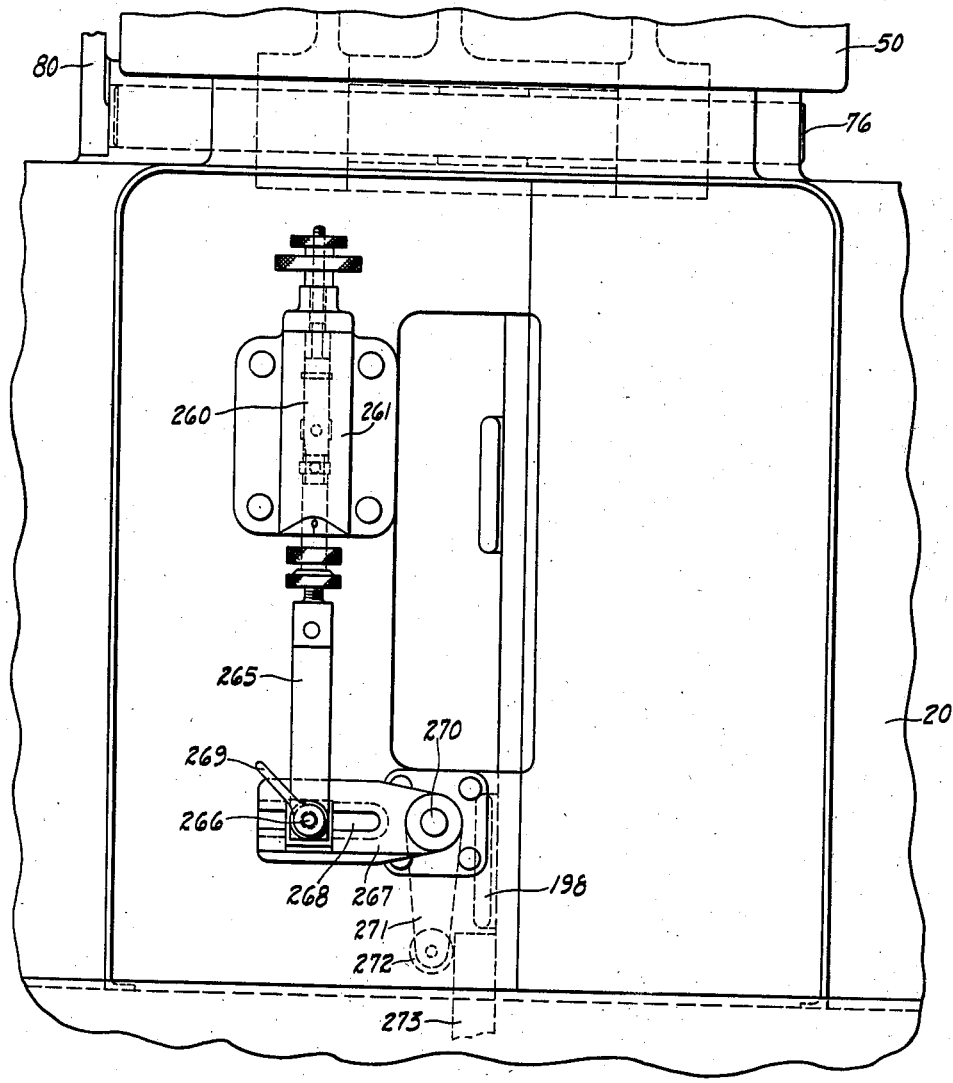

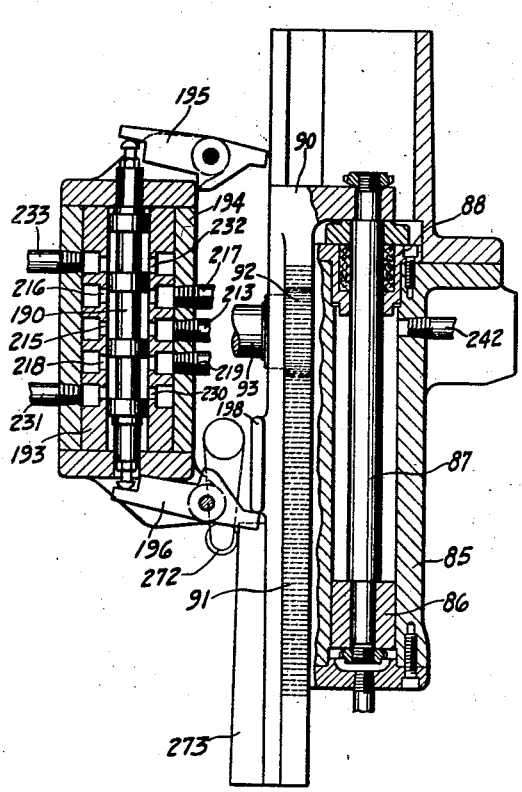
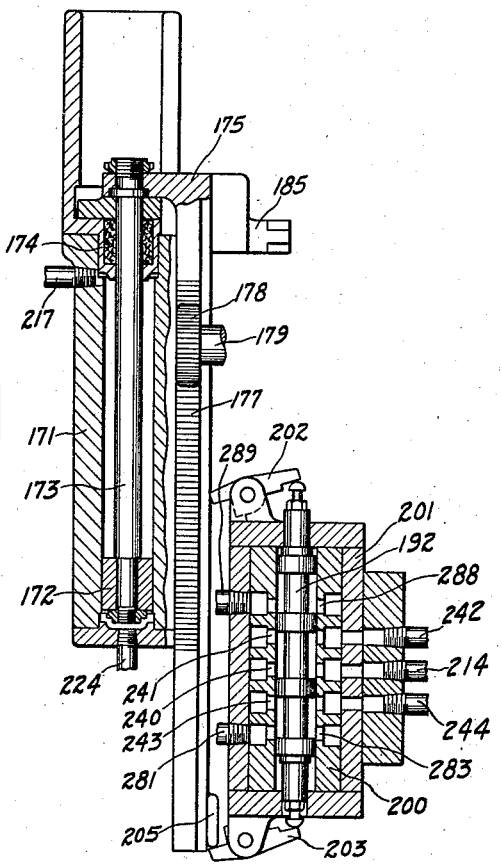

Sept. 8, 1942.  E. W. BULLOCK ET AL  2,294,891
MACHINE FOR HARDENING GEARS
Filed Aug. 20, 1940  11 Sheets-Sheet 9

Inventor
E. W. BULLOCK AND J. V. FIDD
By
B. Schlesinger
Attorney

Sept. 8, 1942.　　E. W. BULLOCK ET AL　　2,294,891
MACHINE FOR HARDENING GEARS
Filed Aug. 20, 1940　　11 Sheets-Sheet 10

Inventor
E. W. BULLOCK AND J. V. FIDD
By B. Schlesinger
Attorney

Sept. 8, 1942.  E. W. BULLOCK ET AL  2,294,891
MACHINE FOR HARDENING GEARS
Filed Aug. 20, 1940   11 Sheets-Sheet 11

Inventor
E.W. BULLOCK AND J.V. FIDD
By
B. Schlesinger
Attorney

Patented Sept. 8, 1942

2,294,891

UNITED STATES PATENT OFFICE 2,294,891

MACHINE FOR HARDENING GEARS

Edward W. Bullock and Joseph V. Fidd, Rochester, N. Y., assignors to Gleason Works, Rochester, N. Y., a corporation of New York Application August 20, 1940, Serial No. 353,376

18 Claims. (Cl. 266—5)

The present invention relates to machines for surface-hardening gear teeth and particularly to machines for the localized hardening of the teeth of spiral bevel and hypoid gears by movement of a heating element, such as an oxy-acetylene torch, longitudinally of each tooth and subsequently quenching or air-cooling the teeth.

One object of the invention is to provide a surface-hardening machine which will be fully automatic in operation. To this end, it is a purpose of the invention to provide a machine in which the torch or other heating element is moved longitudinally of the teeth automatically first in one direction and then in the other and in which the work piece is indexed automatically, after each tooth has been treated, so as to move a new tooth into position to be hardened.

Another object of the invention is to provide a machine in which the movement of the heating element lengthwise of the teeth is interlocked with the indexing movement of the work to insure that a tooth has been fully heat-treated before the work is indexed and, vice versa, that indexing of the work is completed before movement of the heating element for treating of a new tooth begins.

A further object of the invention is to provide a machine on which spiral bevel, hypoid, helical, and similar gears, which have longitudinally inclined teeth, may be accurately and precisely hardened for the full heights of their teeth along the full length of their teeth.

A still further object of the invention is to provide a machine of the type described on which spiral bevel, hypoid and similar gears of either hand of lengthwise tooth inclination can be conveniently hardened.

Still another object of the invention is to provide a machine in which the various parts and operations are fluid-pressure actuated and controlled, and, in this connection, a further purpose of the invention is to provide a fluid-pressure actuated drive for the ram or slide, which carries the heating element, which will allow of change of stroke of the ram or slide for gears of different face width, but in which the stroke of the actuating piston itself will be constant for all jobs.

Other objects of the invention will be apparent hereinafter from the specification and from the recital of the appended claims.

In the drawings:

Fig. 7 is a fragmentary end elevation, looking at the torch end of the machine and showing particularly the throttle valve for controlling the speed of movement of the ram that carries the heating elements;

Fig. 8 is a detail view showing in section the piston which operates the torch carrying slide or ram and the valve, which is associated therewith and which controls the movement of the piston that operates the indexing mechanism of the machine;

Fig. 9 is a corresponding view showing the piston, which actuates the indexing mechanism, and the valve, which is associated therewith, which controls the operation of the piston that actuates the torch carrying ram;

Figure 1:
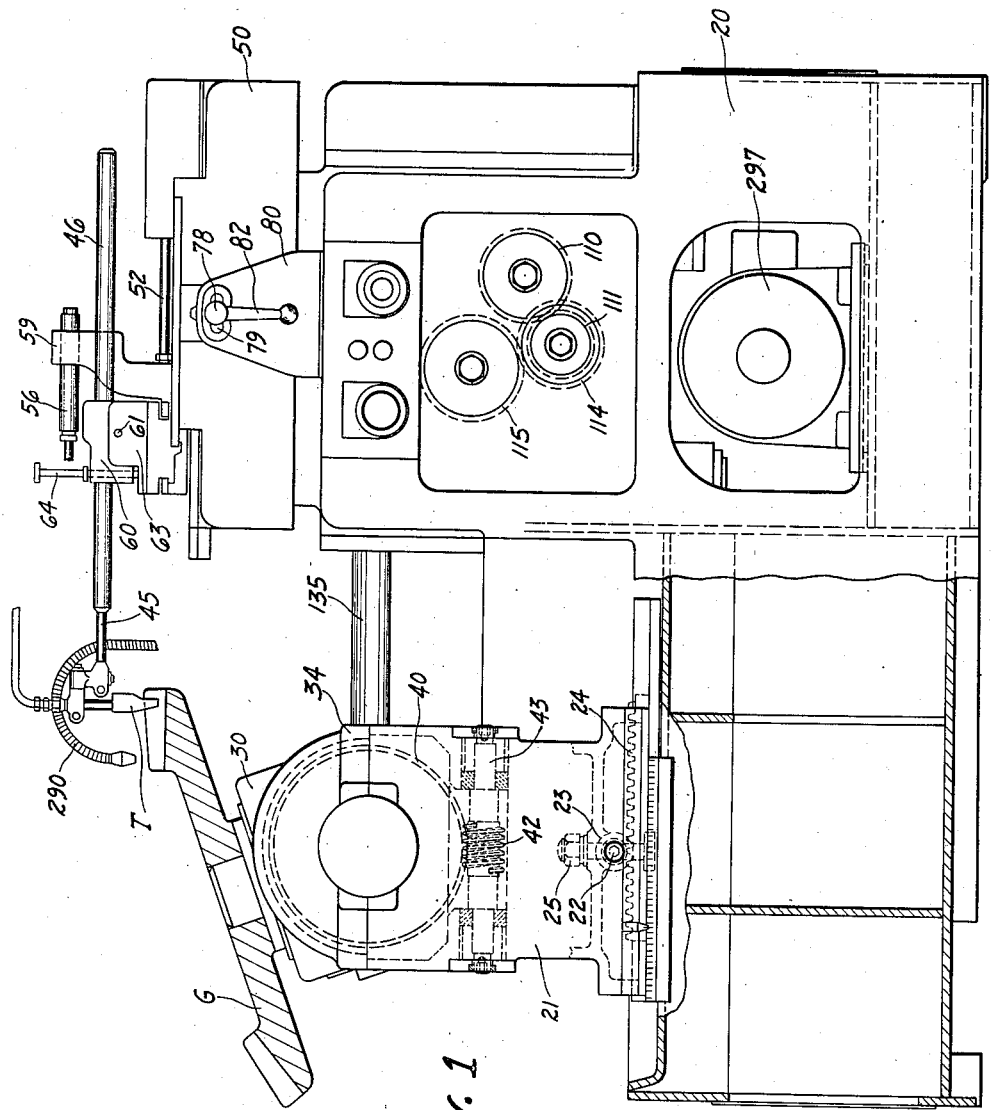
Fig. 1 is a side elevation, with parts broken away, of a machine built according to one embodiment of this invention.

The machine illustrated in the drawings is in many respects an improvement over the machine of the Slade U. S. Patent No. 2,102,040 of December 14, 1937. Like the machine of the Slade patent, it has two torches for simultaneously heat-treating opposite sides of a tooth of a gear. Like the machine of the Slade patent, these torches are mounted in a pair of blocks that are carried on a ram or slide, which is hydraulically reciprocated to move the torches along opposite sides of a gear tooth from end to end of the tooth. Like the machine of the Slade patent, the blocks are slidably mounted on the ram for movement toward and from one another, transversely of the direction of movement of the ram, so that the torches may be maintained at constant distances from the opposite sides of a tooth as they move from one end of the tooth to the other. Like the machine of the Slade patent, cam-rails are provided for controlling the position of the blocks as the torches move along the length of a tooth, so that the torches converge, for instance, as they move from the large to the small end of a bevel gear tooth.

The machine of the present invention differs from the machine illustrated in the Slade patent, however, in a number of features. While the ram is hydraulically actuated, the stroke of the actuating piston is constant for all gears, regardless of the length of face. The necessary flexibility is achieved by using the piston to drive a train of gearing that, in turn, drives the ram. A set of change gears are included in this train, so that, by changing these gears, the length of stroke of the ram can be varied to suit the length of face of the gear which is to be hardened.

The machine of the present invention also has means for automatically indexing the work. The indexing mechanism is fluid-pressure actuated, and this fluid-pressure actuating mechanism is interlocked with the fluid-pressure actuating mechanism which operates the ram. In the preferred construction, the index actuating piston carries a pair of trips which trip the reverse valve which controls the direction of movement of the ram actuating piston, and vice versa.

Preferably, as in the machine of the Slade patent, the torches are moved rapidly along each tooth in one direction to preheat the tooth, and are then moved more slowly along the tooth in the opposite direction to bring the tooth up to the temperature required for hardening. Preferably for the hardening of gears, such as bevel gears, which have teeth changing in thickness from end to end, the movement of the torches, as in the machine of the Slade patent, is accelerated as they approach the small end of the teeth to avoid burning the teeth. Any other suitable method of operation may be employed, however, if desired. The speed of movement of the ram is controlled by a throttle valve which is operated by a cam that is secured to the ram-actuating piston.

For hardening straight bevel or spur gears, the work is held stationary during movement of the torches along the length of the teeth, just as is the case in the machine of the Slade patent. For hardening spiral bevel, hypoid, helical and similar gears, that have teeth which are inclined longitudinally to the axis of the gear, means is provided in the present machine, however, for positively rotating the work in time with the movement of the ram. Thus, as the torches move along the length of a tooth from one end to the other, the tooth is rotated under the torches to enable successive portions of the tooth to be hardened progressively and uniformly and to the desired depth. For this purpose, the work is driven through a train of gearing which may be actuated, as illustrated in the accompanying drawings, by the same piston that actuates the ram. Change gears incorporated in this train allow of properly proportioning the rotation of the work to the ram movement to suit the gear which is to be hardened. There is a differential incorporated in this train and the indexing mechanism of the machine is connected to one element of this differential. During hardening of a gear tooth, straight or spiral, this element is held against rotation. For indexing, this element is released and rotated. When spiral bevels, hypoids, helicals or similar gears are being treated, the rotation of this element imparts an algebraic movement to the work additional to that which the work has during hardening of a tooth. Thus the gear is indexed. When straight bevel or spur gears are to be hardened, the whole gear train that drives the work is held against rotation during hardening of a tooth, but indexing of the work is effected, as before, through the described element of the differential, which is released and rotated when the hardening of a tooth has been completed.

To accommodate spiral bevel, hypoid or helical gears of different hands, the work spindle is mounted in a trunnioned support which is rotatably adjustable to reverse the position of the work spindle end for end. The final drive to the work spindle is effected preferably through a pair of bevel gears, and the drive pinion of this pair is mounted coaxially of the trunnions for the work support. Hence, when the work support is adjusted angularly about its trunnions, the drive pinion remains in engagement with the driven gear. When one end of the work spindle is in operative relation to the torches, the spindle will be driven in one direction and, when the opposite end of the spindle is in operative position, the spindle will be driven in the opposite direction. Each end of the spindle is made so that it will support a work piece. Thus the machine can readily be employed to harden either right or left hand gears.

Figure 4:
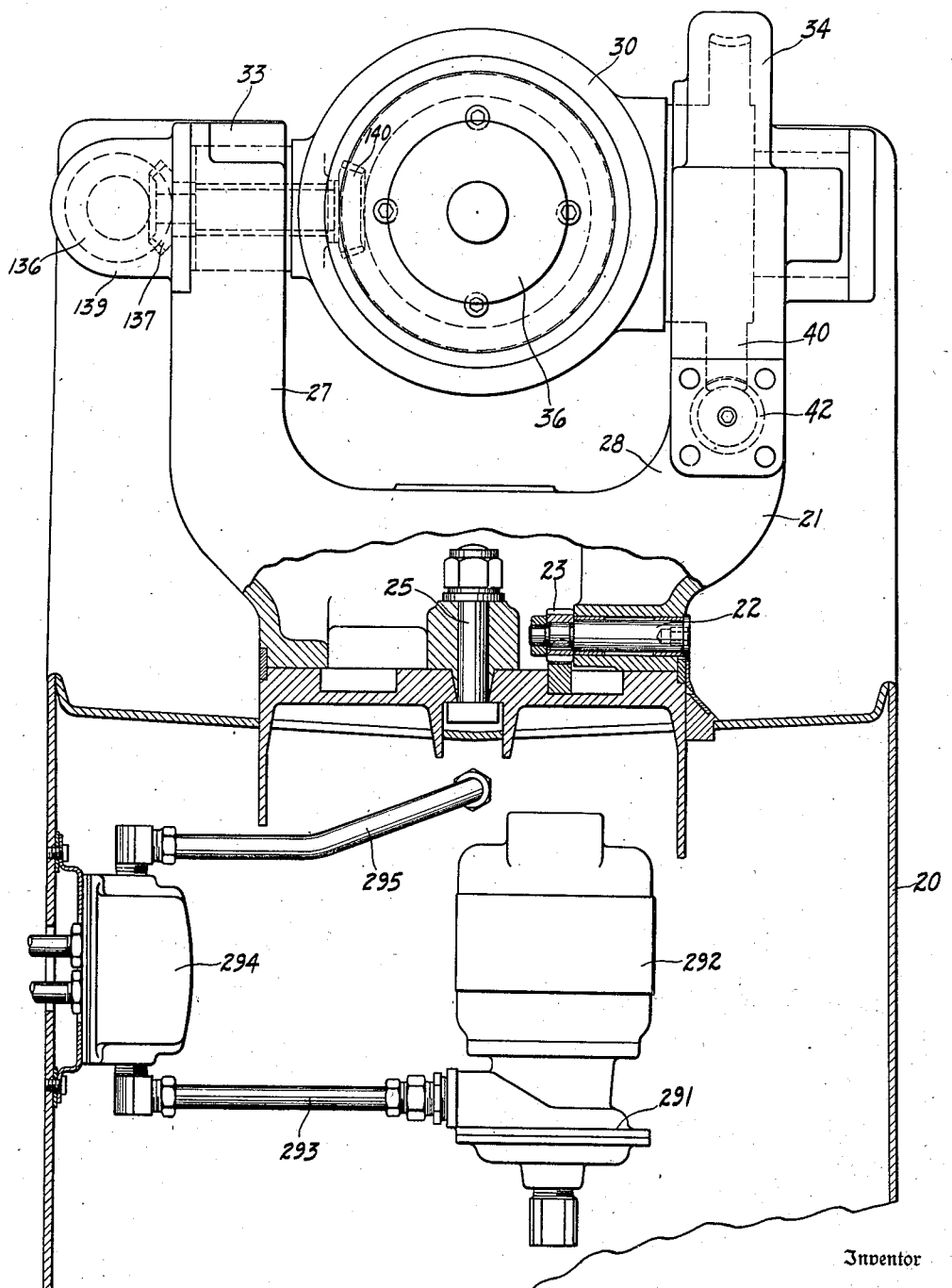
Fig. 4 is an end elevation of the machine, with parts broken away, looking at the work end of the machine.

Reference will now be had to the drawings for a more detailed description of the embodiment of the invention illustrated therein. 20 denotes the base or frame of the machine. Mounted on this base for sliding adjustment thereon longitudinally of the base is the work support 21 (Figs. 1 and 4). This adjustment is effected by manual rotation of a stub shaft 22 to which is keyed a spur pinion 23. The pinion 23 meshes with a rack 24 which is secured to the base of the machine. The work support may be secured in any adjusted position by means of a T-bolt 25.

Figure 5:
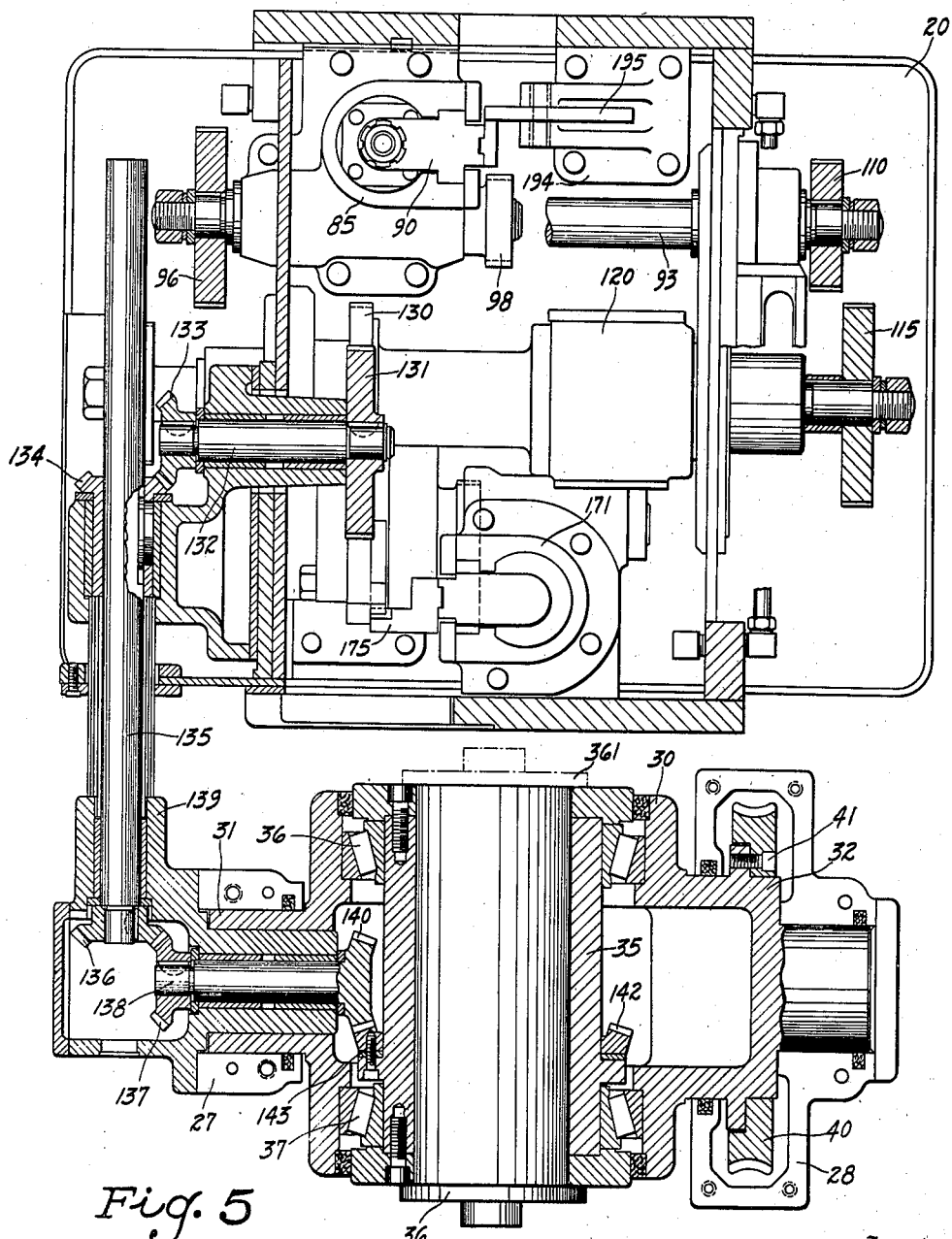
Fig. 5 is a horizontal sectional view through the machine.

The work support is formed with a pair of spaced arms 27 and 28. The upper ends of these arms are formed as bearings to receive the trunnions 31 and 32 which are formed integral with the work head 30 (Figs. 4 and 5). The trunnions are held in the bearings by cap members 33 and 34 of usual construction.

The work spindle 35 of the machine is journaled on anti-friction bearings 36 and 37 in the work head 30. The work spindle 35 is bored all the way through so that a work supporting arbor, such as shown at 36, may be mounted in either end of the spindle. The position which such an arbor would occupy, when mounted in one end of the spindle, is shown in full lines at 36, and the position which the arbor would occupy when mounted in the other end of the spindle is indicated in dotted lines at 36'.

For reversing the position of the spindle to bring either end of the spindle into operative position, and for otherwise adjusting the spindle so that various forms of gears may be hardened, there is a worm wheel 40 secured to the trunnion 32 by screws 41 (Fig. 5). A worm 42 meshes with this worm wheel. This worm is secured to or integral with a manually rotatable shaft 43 that is journaled in the work support 21.

The torches T (Fig. 1) are adjustably supported by pipes 45 and 45' (Fig. 2) which telescope into other pipes 46 and 46', respectively. The pipes 46 and 46' are connected by flexible tubing 47 and 47', respectively, with the blocks 48 and 48', respectively. The blocks 48 and 48' are mounted on the cradle 50. Water or other suitable coolant is supplied to the blocks 48 and 48', respectively, through the ducts 51 and 51' and the pipes 52 and 52' which have telescoping connection with the ducts 51 and 51'. The ducts 51 and 51' are bored in a block 53 which is integral with the cradle 50. Water may be supplied to these ducts 51 and 51' from any suitable source in order to cool the torches. The oxyacetylene gas is supplied to the torches through flexible hose 54 and 54'. These are connected to a block 55 which is connected to a mixing chamber 56. This chamber is supported in a post 59 which is integral with the cradle 50. The oxygen and acetylene gas is supplied to the mixing chamber 56 through pipes 57 and 58.

As clearly shown in Fig. 1, the torches T are mounted on the pipes 45 and 45' to have a double-swivel, universal adjustment with reference to the pipes so that the torches may be adjusted at a suitable angle and height with reference to the work which is to be hardened. This mounting forms no part of the present invention and need not be described further here.

The pipes 46 and 46' are mounted in blocks 60 and 60' (Figs. 1, 3 and 2), respectively. These blocks 60 and 60' are pivotally mounted by means of pins 61 and 61', respectively, on blocks 63 and 63', respectively. The pivotal mounting permits of angular adjustment of the torches in vertical planes. Pins 64 and 64', which thread into the blocks 60 and 65, respectively, and whose lower ends engage the upper faces of the blocks 63 and 63', respectively, are provided to permit this angular adjustment of the blocks 60 and 60' on the blocks 63 and 63', respectively, to be effected manually.

The blocks 63 and 63' are mounted for transverse sliding movement in guides formed on a plate 65 which is secured in any suitable manner to a ram or slide 66. The blocks 63 and 63' are urged away from one another by coil springs 67, which are interposed between the blocks and tubes 68. Each tube is connected to one of the blocks 63 or 63', as the case may be, and has a telescoping fit into a hole 68 formed in the other block 63' or 63.

The block 63 carries a roller 70 on a pin 71, and the block 63' carries a roller 70' on the pin 71'. The rollers 70 and 70', respectively, engage cam rails 72 and 72', respectively. These cam rails are adjustable angularly on the upper face of the cradle 50 and may be secured in any angular position by the clamp plates 73 and 73', respectively. The clamp plates are secured in clamping position by T-bolts 74 and 74', respectively, which pass through elongated slots 77 and 77', respectively, in the cam rails 72 and 72', respectively, and engage in aligned elongated slots 83 and 83', respectively, formed in the cradle 50. They are manipulated by levers 84 and 84', respectively.

Figure 2:
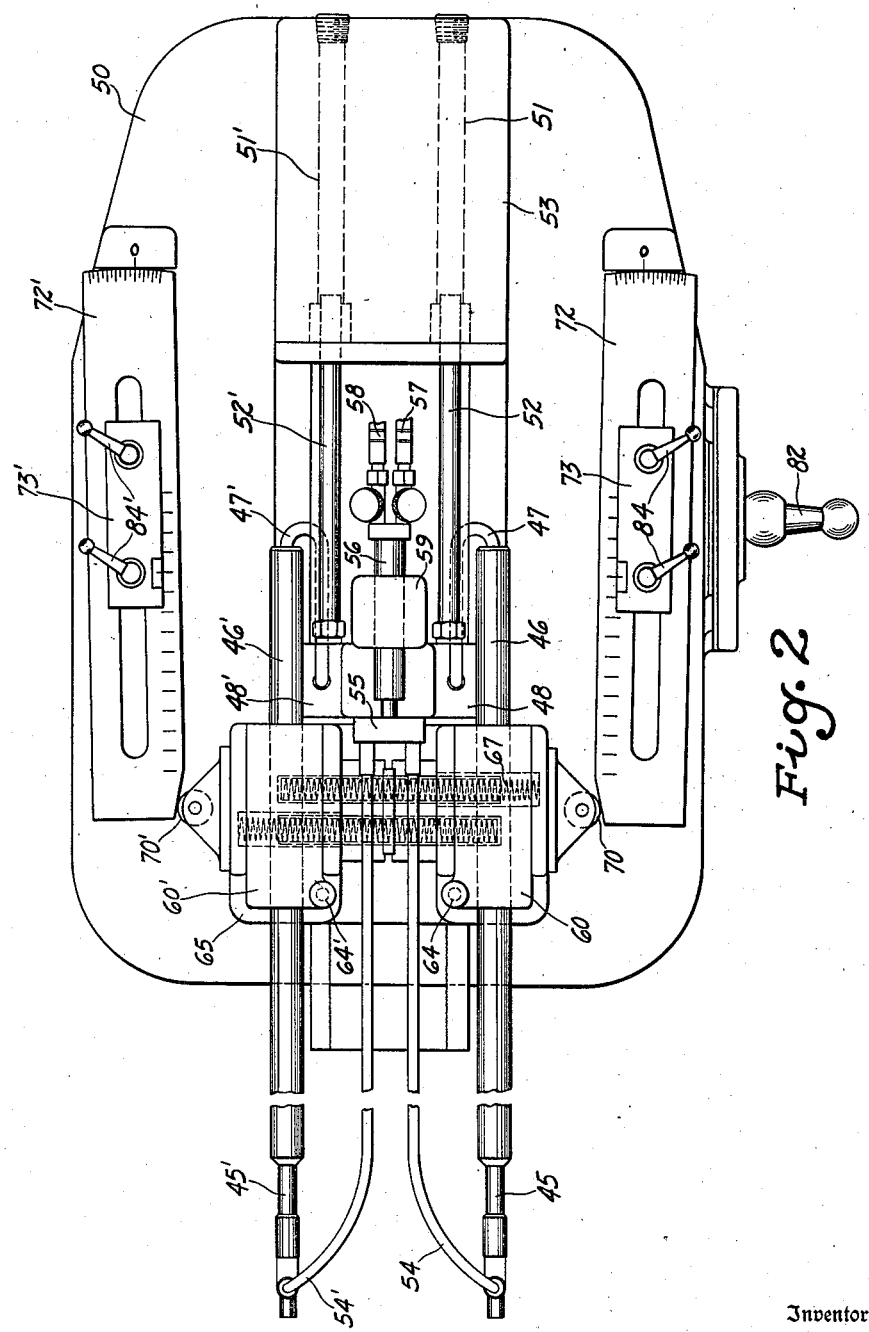
Fig. 2 is a plan view, on a somewhat enlarged scale, of the torch end of the machine.
Figure 3:
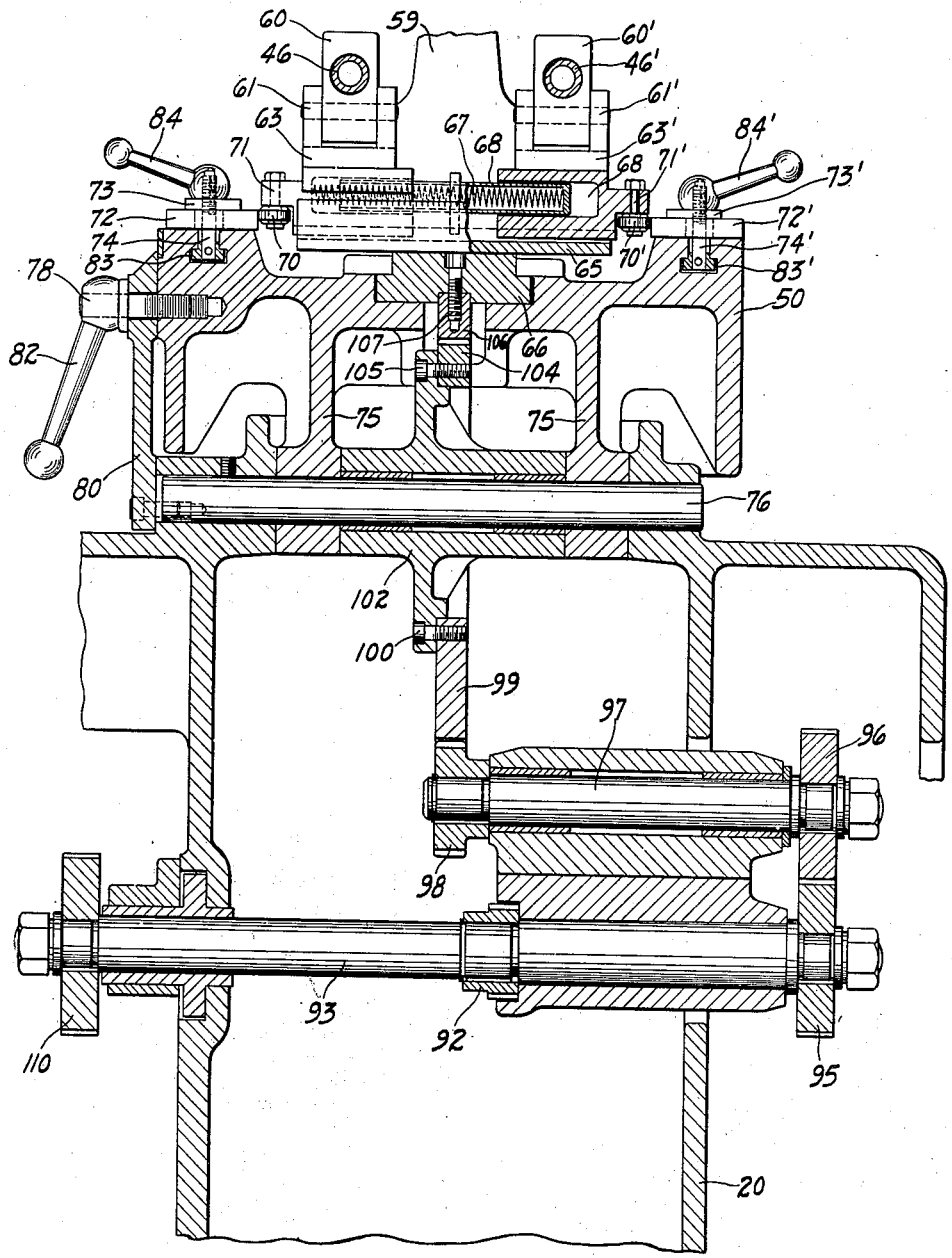
Fig. 3 is a fragmentary vertical sectional view through the torch end of the machine.

The rollers 70 and 70' roll along the guide surfaces of the cam rails 72 and 72' as the ram 66 reciprocates, and when the cam rails are inclined to one another, as shown in Fig. 2, the blocks 63 and 63' will be moved toward one another as the torches move from one end of a gear tooth to another. Thus, the torches may be maintained at uniform distances from opposite sides of a tooth of a bevel gear, for instance, in the hardening of the teeth of such a gear.

The cradle 50 has depending arms 75 (Fig. 3) by means of which it is pivotally mounted upon a pin or stud 76 that is secured in the base 20 of the machine. This pivotal mounting permits of angular adjustment of the cradle. The cradle is secured in any position of its angular adjustment by a clamping lever 82. The clamping lever 82 threads onto a bolt 78. The bolt 78 passes through an arcuate slot 79, which is formed in an ear 80 (Figs. 1 and 3) concentric with the pin or stud 76, and it threads into the cradle 50. The ear 80 is secured to the base 20.

The described adjustments and mountings of the torches are quite similar to those described in the Slade patent and form no part of the present invention. The drive to the ram 66, which is new, will now be described.

Secured in the base of the machine (Figs. 6, 8, 14 and 15) is a cylinder 85. A piston 86 is mounted for reciprocation in this cylinder and to this piston is secured the piston rod 87. The piston rod 87 extends through a packing-box 88, that closes one end of the cylinder, and to the projecting end of the piston, there is secured a slide 90.

Integral with the slide 90 is a rack 91. The rack 91 meshes with a spur pinion 92 which is keyed to a shaft 93. The shaft 93 is journaled in the wall of the cylinder 85 and in the base 20 of the machine. There is a spur gear 95 keyed to one end of the shaft 93, (Figs. 3, 6, 14 and 15). The spur gear 95 meshes with a spur gear 96 that is keyed to the outer end of a shaft 97. The shaft 97 is suitably journaled in the base 20 of the machine and has a spur pinion 98 keyed to its inner end. This spur pinion 98 meshes with a spur gear segment 99 which is secured by screws 100 to a rocker member 102. The rocker member 102 is journaled on the stud 76. A spur gear segment 104 is fastened to the rocker member 102 by screws 105. This segment meshes with a rack 106 which is secured by screws 107 to the ram or slide 66. Thus as the piston 86 is moved in one or the other direction in the cylinder 85, the ram 66 will be moved in one or the other direction to carry the torches along the length of a tooth of the gear to be hardened.

For the hardening of spiral bevel, hypoid, helical and similar gears, as already described, the work is rotated under the torches as they move longitudinally of the teeth. For this purpose, the work spindle is driven in time with the movement of the ram 66. The drive to the work spindle is from the shaft 93. There is a spur gear 110 (Figs. 6 and 14) keyed to the shaft 93. This spur gear meshes with a spur gear 111 which is journaled on a stud 112. The stud 112 is adjustably secured in the quadrant 113. There is a spur gear 114 integral with the spur gear 111. This spur gear 114 meshes with a spur gear 115 which is keyed to a shaft 116. The shaft 116 is suitably journaled in an arm or sleeve 119 which is integral with a differential housing 120, and which projects from one side of the differential housing. Another sleeve or arm 121 projects from the opposite side of the differential housing and is integral therewith. The differential housing is journaled by means of these arms 119 and 121 in the base 20 of the machine.

The differential housing 120 encloses a set of bevel differential gears. One of the side gears 125 of the differential is keyed to the shaft 116. The other side gear 128 of the differential is keyed to a shaft 129 that is journaled suitably in the sleeve 121. The two side gears 125 and 128 mesh with the interposed planetary gear 126 of the differential. The planetary gear 126 is integral with the yoke member 127. This yoke member 127 is suitably journaled in the differential housing 120.

During actual hardening of a tooth of any type gear, the shaft 129 and side gear 128 are locked against rotation by the index locking mechanism of the machine as will be described in more detail later. During hardening of straight bevel and spur gears, the shaft 116 will also be ordinarily locked against rotation as will be described later. During hardening of the teeth of spiral bevel, hypoid, helical, and like gears, however, the shaft 116 will be free to rotate. Thus, as piston 86 is moved up or down to move the ram 66 forward or back, the differential housing 120 will be rotated in time with the ram movement.

There is a spur gear 130 integral with the sleeve 121 of the differential housing. This spur gear meshes with a spur gear 131 (Figs. 5 and 14) which is keyed to the inner end of a shaft 132. The shaft 132 is journaled in the base of the machine and has a bevel gear 133 keyed to its outer end. This bevel gear meshes with a bevel gear 134 which has a sliding key connection with a shaft 135. There is a bevel gear 136 keyed to one end of the shaft 135. This bevel gear meshes with a bevel gear 137 which is keyed to a shaft 138. The shaft 138 is journaled in a bracket 139 coaxially of the trunnion 31 of the work head 30. The bracket 139 is secured to the arm 27. There is a bevel pinion 140 integral with the shaft 138 at the inner end of the shaft. This bevel pinion meshes with a bevel gear 142 which is fastened by screws 143 to the work spindle 35. Through the drive described, then, the work spindle may be rotated in time with the movement of the torch-carrying ram 66 to keep a tooth of a spiral bevel, hypoid, helical or similar gear centered between the torches T as the torches move along the length of the tooth.

Since the drive to the work spindle is through the shaft 138 and bevel pinion 140, which are mounted coaxial of the pivotal mounting of the work head 30, it will be seen that the work spindle can be reversed end for end while the drive to the work spindle is maintained. It will be further seen that by adjusting the work spindle, through an angle of 180°, the direction of rotation of the work spindle can be reversed for a given direction of movement of the piston 86. Thus, it will be seen, that by reversing the work spindle end for end, gears of opposite hand of spiral can be hardened.

As already stated, the side gear 128 of the differential is held against rotation during actual hardening of the teeth of any gear and this side gear 128 is released and rotated, when a tooth has been hardened, to index the work. The mechanism for holding the element 128 of the differential against rotation, during hardening, and for rotating it, to effect indexing, will now be described.

The shaft 129 has a spur gear 150 (Figs. 6 and 14) keyed to its outer end. This spur gear meshes with a spur gear 151 which is journaled on the stud 152 of a quadrant 153. The spur gear 154 is integral with the gear 151. Spur gear 154 meshes with the spur gear 155 which is keyed to the outer end of a shaft 156.

This shaft 156 is journaled in the base of the machine and keyed to its inner end is a rotary member 157. This rotary member 157 has a stop plate 158 and a ratchet member 159 formed integral with it. The stop plate has a notch 160 (Figs. 10, 11 and 12) formed in its periphery. A lock dog 161 is adapted to engage this notch 160. The lock dog 161 is integral with a lever 162 which is pivotally mounted by means of a pin 163 on a plate 164. The plate 164 is secured by screws 165 (Fig. 6) to the base 20 of the machine.

The lock dog 161 is constantly urged into engagement with the stop plate 158 by a spring pressed plunger 165. This plunger is adapted to slide in a hole drilled in the plate 164 and it has a pivotal connection at one end by means of the pin 166, with the lever 162.

When the locking dog 161 is in engagement with the notch 160 of the stop plate 158, the element 128 of the differential is held against rotation. When the locking dog is released, however, the element 128 of the differential may be rotated to rotate the work spindle and effect indexing of the work. The indexing mechanism will now be described.

Figure 6:
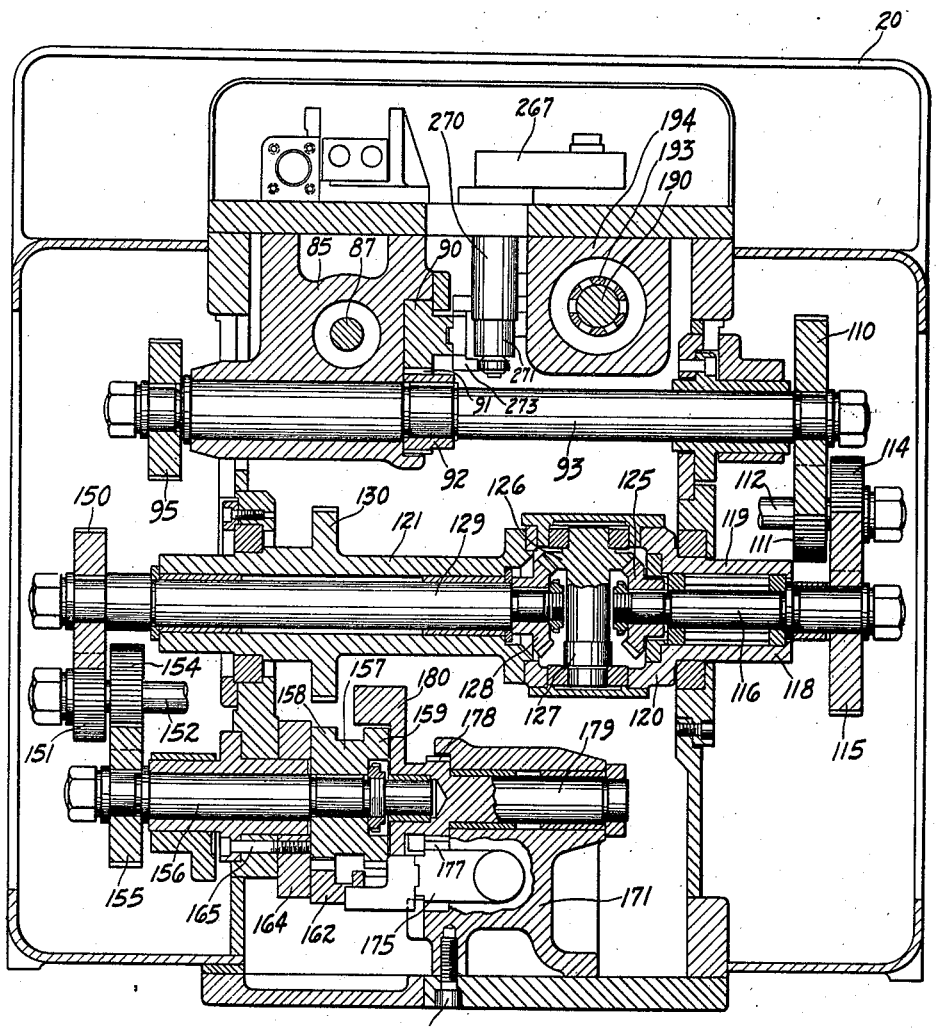
Fig. 6 is a horizontal sectional view through the torch end of the machine, taken in a plane below the plane of Fig. 5.
Figure 13:
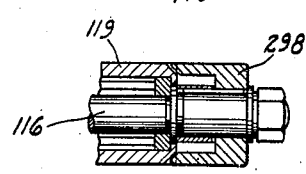
Fig. 13 is a fragmentary view showing the means that may be employed for locking the differential shaft of the machine against rotation, when the machine is to be employed for hardening straight bevel or spur gears.
Figure 11:
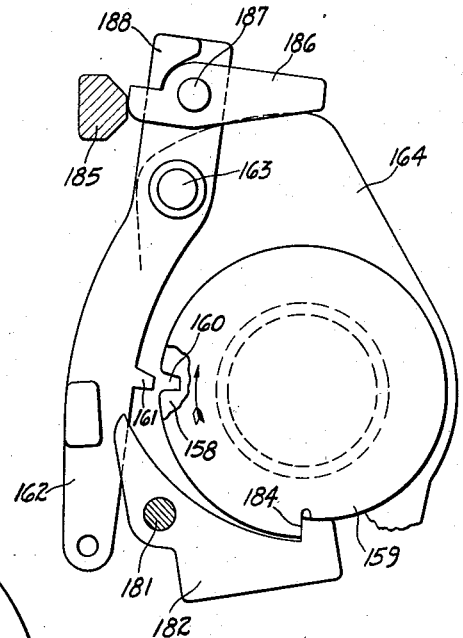
Fig. 11 is a fragmentary view showing certain of the parts, which are illustrated in Fig. 10, in the positions which they occupy at a different point in the indexing operation.
Figure 10:
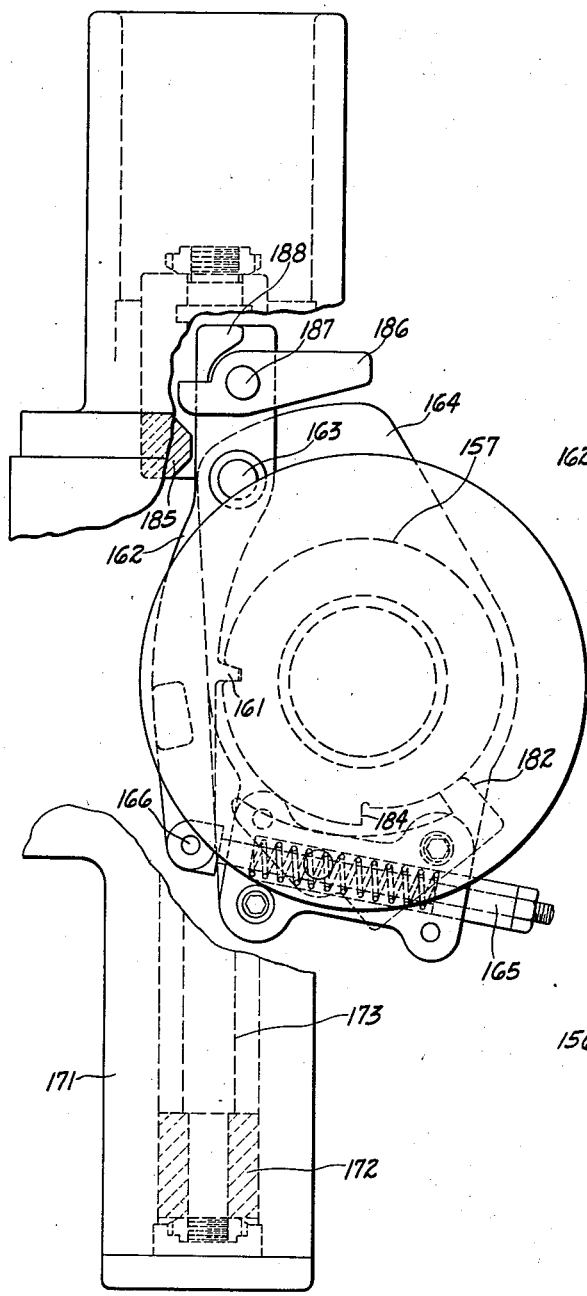
Fig. 10 is a fragmentary view on an enlarged scale, showing the index lock-up and actuating mechanism.
Figure 12:
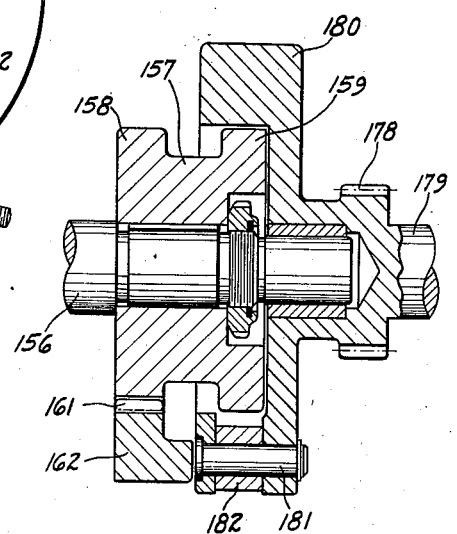
Fig. 12 is a sectional view through the index mechanism.
Figure 14:
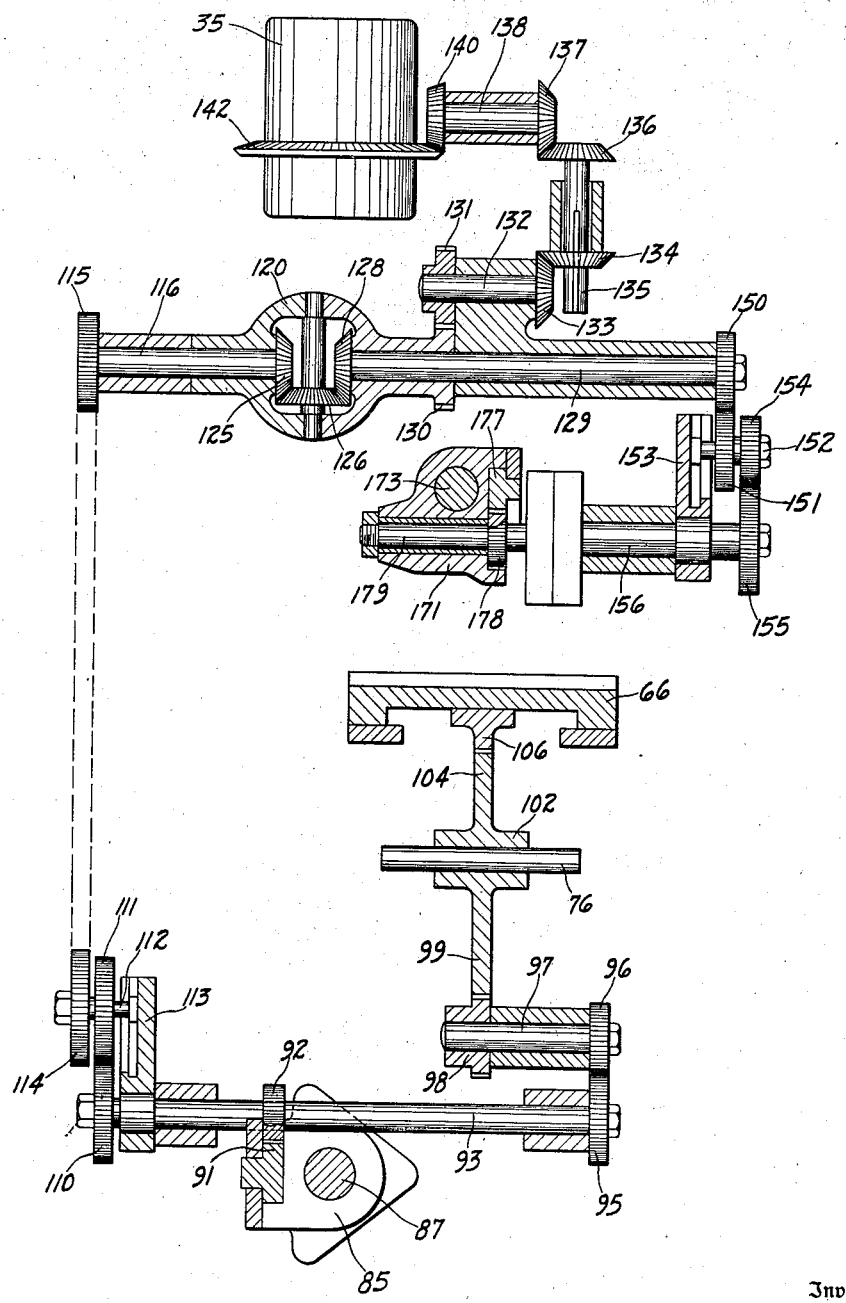
Fig. 14 is a drive diagram of the machine.

Secured in the base of the machine, by means of screws 170 (Figs. 6, 9, 10, 14 and 15) is a cylinder 171. The piston 172 is mounted to reciprocate in this cylinder. There is a piston rod 173 secured to this piston. This piston rod 173 extends through a packing box 174 which closes one end of the cylinder. A slide 175 is fastened to the projecting end of the piston rod. This slide has a rack 177 formed integral with it. A spur pinion 178 meshes with the rack 177. This spur pinion is integral with a shaft 179 that is journaled in the wall of the cylinder housing 171. The pinion 178 and shaft 179 are also integral with an arm 180 (Figs. 6 and 12). On this arm 180, there is pivotally mounted, by means of the pin 181 a pawl 182 (Figs. 10, 11 and 12). The pawl is adapted to engage a lug or ratchet tooth 184 that is formed on the periphery of the ratchet member 159.

The pawl is constantly urged into operative position by means of a coil spring (not shown). There is a lug or trip member 185 (Figs. 9, 10 and 11) formed on the plate 175 at one side thereof. This lug is adapted to engage a trip dog 186 which is pivotally mounted, by means of the pin 187, on the lock lever 162.

The trip dog 186 has a long tail portion and is normally held in engagement with a lug 188, that is formed integral with the lock lever 162, by the weight of this tail portion. When the piston 172 moves upwardly from the position shown in Figs. 9 and 10, however, the lug 185 engages the trip dog 186, and the lock lever 162 is rocked out of engagement with the stop plate 158, releasing the stop plate. As the piston 172 moves upwardly, also, the pinion 178 and arm 180 are rotated by engagement of the pinion 178 with the rack 177 which is secured to the piston. Thus when the piston 172 has moved far enough (Fig. 11) to cause the lock dog 162 to be disengaged from the stop plate 158, the arm 180 will have rotated far enough to bring the pawl 182 into engagement with the tooth 184 of the ratchet member 159. Thereafter, as the pinion 178 continues to rotate, in the upward movement of the piston 172, rotation will be imparted through the pawl 182 and ratchet member 159 to the shaft 156, and through the change gears 155, 154, 151 and 150 to the shaft 129. Thus the element 128 of the differential will be rotated to impart rotation to the work spindle.

If the work spindle is already rotating, as will be the case during the hardening of spiral bevel, hypoid and helical gears, the rotation of the differential side gear 128 will impart an additional rotation to the work spindle of an algebraic nature which will add to or substract from the rotation of the work spindle imparted during hardening and will effect the indexing of the gear. If a straight bevel or spur gear is being hardened, the side gear 125 and the work spindle 35 will be held against rotation during hardening. When the gear 128 is rotated, then, for indexing, the differential housing 120 itself will be rotated to impart through the gears 130, 131, 133, 134, 136, 137, 140 and 142 an indexing rotation to the work spindle to index the gear.

As soon as the lug 185 clears the trip dog 186 in the upward movement of the piston 172, the lock dog 161 will drop back onto the periphery of the stop plate 158. When the notch 160 is brought back into registry with the lock dog 161 by rotation of the member 157, the dog 161 will reenter at the notch 160 and lock the member 157 against rotation. Thus the indexing of the work will have been completed.

After indexing has been completed, the index mechanism is reset by downward return movement of the piston 172. In this downward movement, the lug 185 will reengage the trip dog 186, but will rock this trip dog idly about its pivot pin 187, so that the lock dog 161 will remain in engagement with the stop plate 158. The rotation of the arm 160 will continue, however, until the piston 172 bottoms in the cylinder 171 and the parts have returned to the positions shown in Fig. 10.

Figure 15:
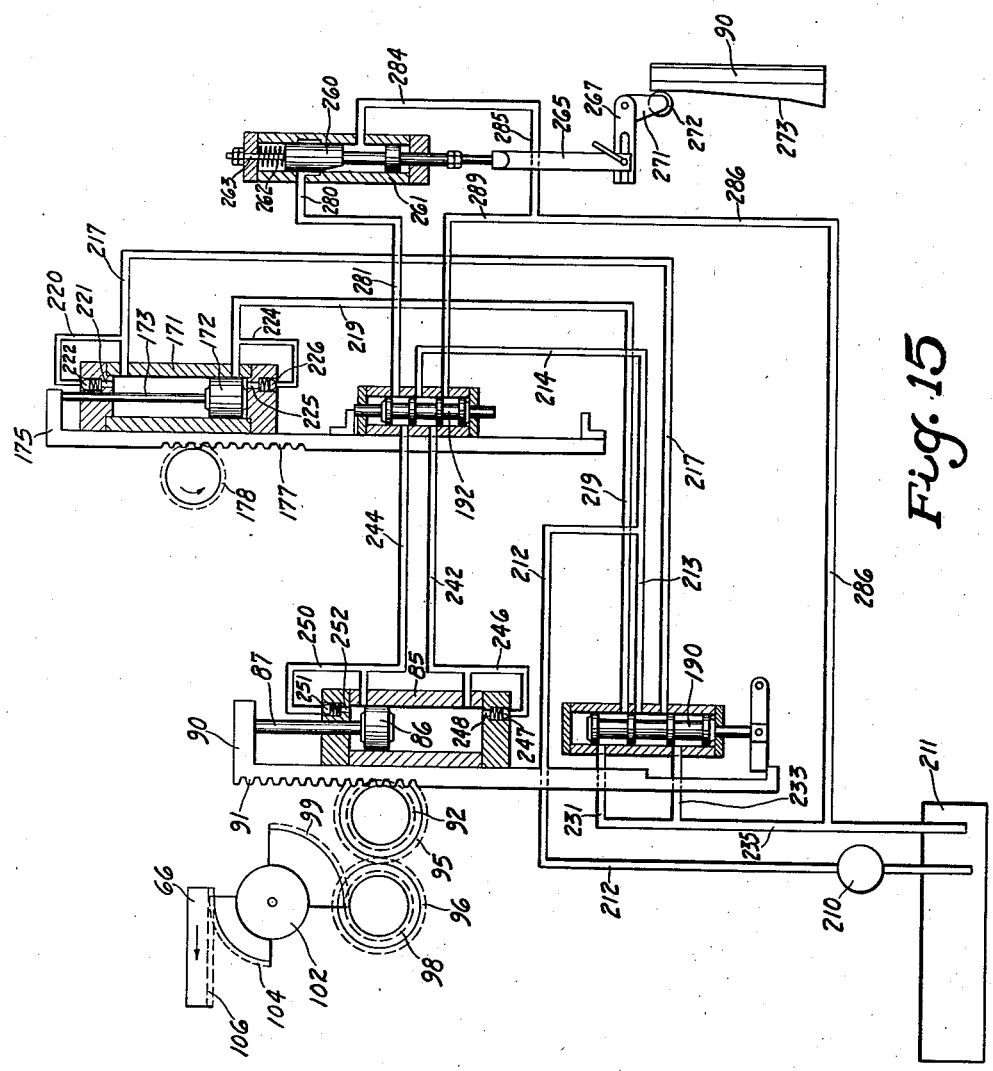
Fig. 15 is a hydraulic diagram of the machine.

As has already been stated, the indexing and ram actuating mechanisms of the machine are interlocked. The reverse valve 190, which controls the direction of movement of the piston 172 (Figs. 8 and 15), is tripped by the movement of the piston 86 and vice versa, the reverse valve 192, which controls the movement of the piston 86, is tripped by the movement of the piston 172 (Figs. 9 and 15).

The reverse valve 190 is adapted to slide in a sleeve 193 which is secured in the valve casing 194. The valve 190 projects at opposite ends through the end walls of the casing 194. Trip dogs 195 and 196, which are pivotally mounted on the valve casing, are adapted to engage the projecting ends of the valve 190 to shift the valve. The trip dogs 195 and 196 are rocked alternately in opposite directions by a lug 198, which is formed integral with the slide 90. This lug engages the tail portions of the trip dogs so that, as the slide 90 moves alternately in opposite directions under actuation of the piston 86, the valve 190 is shifted alternately in opposite directions.

The reverse valve 192 is of similar construction to the reverse valve 190. It is mounted in a sleeve 200 which is secured in the valve casing 201. The valve 192 projects at opposite ends through the end walls of the casing 201 so that it may be engaged by the trip dogs 202 and 203, respectively. These trip dogs are pivotally mounted on opposite end walls of the casing. The trip dogs are adapted to be rocked alternately in opposite directions by engagement with the lug 205. This lug is integral with the slide 175 so that it engages the trip dogs 202 and 203 alternately as the slide 175 is moved alternately in opposite directions under actuation of the piston 172.

The motive fluid is supplied to the pistons 86 and 172 by a pump 210 (Fig. 15), which draws the motive fluid from the sump 211 of the machine. The pump is connected by the duct 212 with the ducts 213 and 214. The duct 213 communicates with the ports 215 in the sleeve 193 (Fig. 8). The valve 190 is connected with one side of the piston 172 by the ports 216 of the sleeve 193 and the duct 217. The valve 190 is connected with the opposite side of the piston 172 by the ports 218 and the duct 219.

To prevent the piston 172 from bottoming too hard in the cylinder 171 at either end of its stroke, dash-pots are provided at the two ends of the cylinder. The duct 217 is connected with the cylinder 171 at a point to be shut off by the piston 172 toward the end of its upward movement. The duct 217 is connected with one end of the cylinder, however, by an auxiliary duct 220. This leads into a duct 221 drilled in the end wall of the cylinder. The connection between the duct 220 and the duct 221 is normally closed by a spring-pressed check-valve 222.

When the piston 172 has moved far enough upwardly, then to close off the duct 217, exhaust from the upper end of the cylinder 171 will be shut off, and the final movement of the piston upwardly will be cushioned by the oil entrapped between the upper end of the piston and the upper end wall of the cylinder. In a similar way, the duct 219 is connected with the cylinder 171 at a point to be shut off by the piston 172 toward the end of the downward movement of the piston, and the duct 219 is connected with the lower end of the cylinder by an auxiliary duct 224 which communicates with a duct 225 in the lower end wall of the cylinder. A spring pressed check valve 226 serves normally to close the connection of the duct 224 with the duct 225. Thus the movement of the piston 172 downwardly will be dashpotted also.

The motive fluid is exhausted from the valve 190 either through the ports 230 and duct 231 (Fig. 8) or through the ports 232 and duct 233. The two ducts 231 and 233 communicate with a duct 235 (Fig. 15) which leads back to the sump 211 of the machine.

The supply duct 214 communicates with the valve 192 through ports 240 (Fig. 9). This valve 192 is connected with one end of the cylinder 85 by means of the ports 241 and the duct 242 (Figs. 9, 8 and 15). The valve 192 is connected with the opposite end of the cylinder 85 through the ports 243 and the duct 244.

The movement of the piston 86 in the cylinder 85 is dash-potted at both ends of the stroke of the piston in the same way as the movements of the piston 172 in the cylinder 171 are dashpotted. Thus, the duct 242 is connected by the auxiliary duct 246, the spring pressed check valve 247 and the duct 248 with the lower end of the cylinder 85 while the duct 244 is connected to the upper end of the cylinder 85 through an auxiliary duct 215, the check valve 251 and the duct 252.

The speed of movement of the torches during the hardening stroke is controlled by a throttle valve 260 (Figs. 7 and 15). This valve throttles the flow of the exhaust from the cylinder 85, during the hardening stroke of the torches. The valve 260 is adapted to slide in a valve chamber 261. It is continuously urged downwardly in this valve chamber by a coil spring 262, which surrounds stem 263, that is connected to the upper end of the valve, and which is interposed between the upper end of the valve casing and the valve itself. The stem of the valve projects through the lower end of the valve casing 261 and has a rod 265 secured to it. The lower end of this rod 265 is adjustably connected by means of a T-bolt 266 with a lever 267. The T-bolt 266 slides in a T-slot 268 formed in the lever 267, and the lever 267 is clamped to the rod 265 by a clamping lever 269 which threads on the T-bolt. The lever 267 is integral with a shaft 270 (Fig. 6) which is journaled in the base of the machine. There is an arm 271 integral with the inner end of this shaft. The arm 271 carries a roller 272 which is adapted to slide on a cam rail 273. The cam rail 273 is secured to or integral with the slide 90 so that it reciprocates with the piston 86.

The throttle valve 260 is connected through the ducts 280 and 281 with the ports 283 of the sleeve 200 (Figs. 9 and 15) of the reverse valve 192. The throttle valve is connected with the sump 211 of the machine by the ducts 284, 285, 286 and 235. The valve 192 is also connected directly with exhaust through the ports 288 of the sleeve 200, and the ducts 289, 286 and 235. When the piston 86 is moving upwardly, then, the rate of its upward movement is controlled by the rate of exhaust from the upper end of the piston through the ducts 244, 281, 280, the throttle valve 260, and the ducts 284, 285, 286 and 235. That is the rate of upward movement of the piston 86 is controlled by the position of the throttle valve 260. Since the position of the throttle valve is controlled by the cam rail 273 which is secured to the slide 90 and piston 86, it will be seen that during the upward, or hardening stroke of the piston 86, complete control can be had over the speed of movement of the torches through suitably shaping the cam rail 273. For hardening bevel gears, for instance, the cam rail 273 may be formed to accelerate the movement of the torches as they approach the small end of a gear tooth. During the return, preheating stroke of the torches, viz., when the piston 86 is moving downwardly, the lower end of the cylinder 85 is fully open to exhaust through the ducts 242, 289, 286 and 235. Thus the preheating stroke is not throttled but proceeds at maximum speed.

To keep the tooth adjacent that which is being hardened from being heated up and being drawn, it is desirable to spray a stream of cool water on the tooth. For this purpose the hose 290 (Fig. 1) may be provided. The water is pumped to the hose from a pump 291 (Fig. 4) mounted in the base 20 of the machine and driven by the motor 292. The water passes from the pump 291 through a tube 293 to a cooling chamber 294 of any suitable construction and thence through the pipe 295 to the hose 290.

The pump 210 (Fig. 15) for the hydraulic system of the machine is driven from a motor 297 (Fig. 1) which is mounted in the base 20 of the machine.

The operation of the machine will be understood from the preceding description but may briefly be summed up here.

First of all, of course, the necessary adjustments of the work and of the torches are made. The work head is adjusted angularly on its trunnions 31 and 32 to position the work in correct angular relation to the torches. If a spur gear is to be hardened, the work head will be adjusted so that the axis of the work spindle is in a horizontal plane. If a bevel gear is to be hardened, the work head will be adjusted so that the axis of the work spindle will be inclined to the horizontal, the angle of inclination depending upon the pitch cone angle of a gear. Fig. 1 shows a bevel gear G mounted on the machine for hardening. The adjustment of the work head is effected, of course, by rotation of the worm shaft 43. In the adjustment of the work head, if the gear to be hardened is a spiral bevel, hypoid, helical, or similar gear, the work head is positioned angularly in accordance with hand of spiral of the teeth of the gear which is to be hardened, so that the work spindle will rotate in the correct direction when the end of the work spindle, which carries the work, is in operative position. The work support 21 is adjusted on the base 20 by rotation of the shaft 22 to position the work in the correct longitudinal position with reference to the stroke of the torches. The cradle 50 is adjusted angularly on the base, so that the torches will follow the root line of the teeth of the gear, by angular adjustment of the cradle about the axis of the rod 76. Further precise individual adjustment of the position of the torches with reference to the root line of the tooth may be obtained by adjusting the screws 64. The cam rails 72 and 72' are adjusted in accordance with the direction of the teeth of the gear which is to be hardened. For a spur gear, the cam rails 72 and 72' are adjusted so that their guide surfaces will be parallel. For a bevel gear, they are adjusted so that the guide surfaces will be inclined toward one another in accordance with the inclination of opposite sides of the tooth of a gear to be hardened.

When the various adjustments of the machine have been made, the hardening operation may be begun. Fig. 15 illustrates the position of the various parts when the torches are being moved forward in their working stroke. At this time the pressure fluid is being supplied from the pump 210 through the ducts 212 and 214, the valve 192, and the ducts 242, 246, and 248 into the lower end of the cylinder 85 to force the piston 86 upwardly from the position shown in Fig. 8 to that shown in Fig. 15. At this time, the motive fluid is exhausting from the upper end of the piston 86 through duct 244, valve 192, ducts 281 and 280, the throttle valve 260, the ducts 284, 285, 286 and 235 back to the sump. The amount of opening in the throttle valve will be controlled by the cam rail 273 which is secured to the slide 90 to which the piston rod 87 is fastened.

As the piston 86 moves upwardly, as described, the rack 91 will be moved upwardly rotating the pinion 92 and actuating the slide or ram 66 through the gearing 95, 96, 98, 99, 104 and 106, to move the ram 66 forwardly carrying the blocks 63 and 63' and the torches with it. The movement of the ram causes the torches to be moved along the length of a tooth of the gear and as they move along the length of the tooth their distance from the sides of the tooth is determined by the shape and setting of the cam rails 72 and 72'.

During this upward movement of the piston 86, the piston 172 will be held in a downward position by supply of the pressure fluid to the upper end of the cylinder 171, the pressure fluid flowing from the duct 212 through the duct 213, the valve 190 and the duct 217 into the upper end of the cylinder 171.

If the train of gearing 110, 111, 114 and 115 is in operation, that is if a spiral bevel, hypoid, helical or similar gear is to be hardened, the work will be rotated, during the upward stroke of the piston 86, through the gears 110, 111, 114, 115, 125, 126, differential housing 120, and gears 130, 131, 133, 134, 136, 137, 140 and 142. This rotation will be in time with the movement of the ram 66 and the torches T carried thereby.

Just before the piston 86 reaches the end of its stroke upwardly in its cylinder 85 it will close off the duct 244, shutting off the exhaust and cushioning the last portion of the upward movement of the piston. In this last part of the upward travel of the piston, the lug 198, carried by the slide 90, will engage the trip dog 195 (Fig. 8) causing the valve 190 to be shifted from the position shown in Figs. 8 and 15 to the opposite end of the valve casing 194.

When the valve 190 is shifted, as described, the line 219 will be put on supply from the line 213. This will cause the pressure fluid to flow to the lower end of the cylinder 172, first through the duct 224, check valve 226 and the duct 225, and then later through both the duct 225 and the duct 219. At the same time, the motive fluid will exhaust from the upper end of the cylinder 171 through the duct 217, the valve 190 and the ducts 233 and 235 to the sump.

As the piston 172 moves upwardly, the rack 177 will be moved upwardly with it, causing the block 185 to strike the trip lever 186 (Figs. 10 and 11). This will cause the locking lever 162 to be swung about its pivot 163, as shown in Fig. 12, releasing the stop plate 158. At the same time, the rack 177 connected to the piston 172 will be moving upwardly, causing the pinion 178 and the arm 180 to be rotated. When the piston is moved far enough to cause the lock dog to be disengaged, as shown in Fig. 11, the pawl 182, which is carried by the arm 180, will have moved far enough to engage the ratchet tooth 184. Hence, after release of the lock dog 161, the sleeve member 157 will be rotated by the pawl 152 through rotation of the pinion 178 and arm 180. Thus, indexing rotation will be imparted to the work spindle through the change gears 155, 154, 151 and 150, and the bevel gear 128. If the work spindle has been rotating during hardening, this rotation of the gear 128 will impart an additional algebraic movement to the work spindle to effect indexing of the spindle. If the work spindle has been stationary during hardening, this rotation of the bevel gear 128 will cause a rotational movement to be imparted to the differential housing 120 and through the gearing 130, 131, 133, 134, 136, 137, 140 and 142 will rotate the work spindle to index the same and bring a new tooth into operative position.

At the end of the indexing stroke of the piston 172, the lug 205 will trip the trip dog 202 to shift the valve 192 from the position shown in Figs. 9 and 15. This will cause the upper end of the cylinder 85 to be put on supply from the line 214 through the valve 192 and the ducts 244, 250 and 252. The piston 86 will therefore be moved downwardly in the cylinder 85, moving the rack 91 downwardly. This will cause the ram 66 to be moved rearwardly to move the torches over the new tooth of the work in the preheating stroke. If the train of gearing 110, 111, 114 and 115 is connected, as is required for the hardening of a gear with spiral or helical teeth, the work spindle 35 will be rotated in the opposite direction from that in which it was rotated on the forward stroke, so that the torches may follow the new tooth correctly during the return, preheating stroke.

During the return stroke of the ram the lower end of the cylinder 85 will be opened fully to exhaust so that the return, preheating stroke may proceed at high speed. The exhaust at this time, is through the duct 242, the ports 241 and 283 of the valve 192, and the ducts 289, 286 and 235 to the sump.

At the end of the described return movement of the piston 86, the lug 198 will strike the trip dog 196 to shift the valve 190 back to the position shown in Figs. 8 and 15. This will cause the piston 172 to be moved downwardly in its cylinder 171 to reset the index mechanism. In this downward stroke of the piston 172, the rack 177 rotates the arm 180 backwardly to return the pawl 182 to the position shown in Fig. 10. In this downward stroke of the piston, the lug 185 (Fig. 9) engages the trip dog 186, but simply rocks that trip dog idly about its pin 187 and the stop plate 158 remains locked up.

At the end of the return stroke of the piston 172, the lug 205 (Fig. 9) engages the trip dog 203 to shift the valve 192 back to the position shown in Figs. 9 and 15. This again puts the lower end of the piston 86 on supply, causing the ram 66 to be moved forwardly on the hardening stroke, as already described.

Thus the machine operates. There is a preheating stroke of the torches in one direction along the length of a tooth. Then the index mechanism is reset. Then the torches move forward in the opposite direction along the length of the tooth in the hardening stroke. Then the blank is indexed. Then the torches are moved on their return preheating stroke on the next tooth, etc. The operation thus proceeds until all of the teeth of the gear have been hardened.

Where a spur gear or a straight bevel gear is to be hardened, the change gear 115 may be taken off of the shaft 116 and the nipple 298 substituted therefor. This nipple is provided with teeth at its inner end which engage teeth cut on the sleeve or arm 119 of the differential housing 120. Thus the shaft 116 will be held against rotation relative to the differential housing. No motion will be transmitted to the differential housing during hardening, but the work will remain stationary on its axis during hardening. The differential housing and work spindle will only be rotated during indexing.

The provision of a geared drive to the work spindle, like the provision of a geared drive to the ram, permits of great flexibility in the operation of the machine through use of change gears. The provision of two pistons for actuating the ram and indexing mechanism, respectively, permits of using these geared drives without any excessive gearing up. Each part may therefore rotate at a practical speed.

While the invention has been described in connection with a particular embodiment thereof, it will be understood that it is capable of still further modification and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described our invention, what we claim is:

1. A machine for hardening gears having longitudinally inclined teeth comprising a rotatable work spindle, a heating element, means for moving the heating element longitudinally of a tooth of the gear to be hardened, and means, including a train of gearing including a set of change gears, for rotating the work spindle in time with the longitudinal movement of the heating element and in proper proportion with said movement and with the inclination of the gear teeth so as to cause the side surface of a tooth of the gear to be presented continuously to the heating element as the element moves from one end of the tooth to the other, and means for periodically indexing the work spindle.

2. A machine for hardening gears having longitudinally inclined teeth comprising a rotatable work spindle, a heating element, a slide on which the heating element is mounted, means for reciprocating the slide, a train of gearing for rotating the work spindle in time with the movement of the slide and in proper proportion with said movement and with the inclination of the gear teeth so as to cause the side surface of a tooth of the gear to be presented continuously to the heating element as the element moves from one end of the tooth to the other, said means comprising a differential, means for locking one element of the differential against movement while the heating element is in operative relation with the work, means for periodically releasing said locking means, and means for rotating said differential element, when released, to index the work.

3. A machine for hardening gears having longitudinally inclined teeth comprising a rotatable work spindle, a reciprocable slide, a heating element mounted on the slide, a train of gearing including a set of change gears for reciprocating the slide, a train of gearing including a set of change gears for rotating the work spindle in time with the movement of the slide and in proper proportion with said movement and with the inclination of the gear teeth so as to cause the side surface of a tooth of the gear to be presented continuously to the heating element as the element moves from one end of the tooth to the other, and a single fluid pressure actuated means for operating both of said trains of gearing and means for periodically indexing the work spindle in time with the movement of the slide.

4. A machine for hardening gears having longitudinally inclined teeth comprising a rotary work spindle, a slide, a heating element mounted on the slide, a support in which the spindle is journaled, a frame on which the support is mounted for rotatable adjustment about an axis extending at right angles to the axis of the work spindle so that the work spindle may be adjusted end for end, means for reciprocating the slide to move the heating element longitudinally of a tooth of the work, and means for rotating the work spindle in any position of adjustment of the work support in time with the movement of the slide and in proper proportion with said movement and with the inclination of the gear teeth so as to cause the side surface of the tooth of a gear to be presented continuously to the heating element as the element moves from one end of the tooth to the other, said last named means being so constructed that on adjustment of the work spindle end for end the direction of rotation of the work spindle will be reversed.

5. A machine for hardening gears having longitudinally inclined teeth comprising a heating element, a rotary work spindle, a support in which the work spindle is journaled, a frame on which the support is mounted for rotatable adjustment about an axis extending at right angles to the axis of the work spindle so that the work spindle may be adjusted end for end, means for moving the heating element longitudinally of a tooth of a gear to be hardened, and means comprising a pair of meshing bevel gears, one of which is secured to the work spindle, and the other of which is journaled coaxially of the axis of adjustment of the work support, for rotating the work spindle in time with the movement of the heating element selectively in either direction depending on the adjusted position of the work spindle and in proper proportion with said movement and with the inclination of the gear teeth so as to cause the side surface of a tooth of the gear to be presented continuously to the heating element as the element moves from one end of the tooth to the other.

6. A machine for hardening gears comprising a rotary work spindle, a slide, a heating element mounted on the slide, means for reciprocating the slide, means for indexing the work spindle after each reciprocation of the slide, and means for interlocking the reciprocating and indexing means so that one in its operation controls the operation of the other.

7. A machine for hardening gears comprising a rotary work spindle, a slide, a heating element mounted on the slide, fluid pressure operated means for reciprocating the slide, fluid pressure operated means for periodically indexing the work support, separate reversing valves controlling the operation of the two fluid pressure operated means, and means whereby each fluid pressure operated means controls the valve which governs the other fluid pressure operated means.

8. A machine for hardening gears having longitudinally inclined teeth comprising a rotary work spindle, a slide, a heating element mounted on the slide, means for reciprocating the slide, means driven in time with the movement of the slide for rotating the work spindle in proper proportion to the movement of the slide and to the inclination of the teeth of the work so as to cause the side surface of a tooth of the gear to be presented continuously to the heating element as the element moves from one end of the tooth to the other and means actuatable periodically in time with the reciprocation of the slide for indexing the work spindle.

9. A machine for hardening gears having longitudinally inclined teeth comprising a rotary work spindle, a slide, a heating element mounted on the slide, a train of gearing, including a set of change gears, for rotating the work spindle in time with the movement of the slide and in proper proportion with said movement and with the inclination of the gear teeth so as to cause the side surface of a tooth of the gear to be presented continuously to the heating element as the heating element moves from one end of the tooth to the other, and means for periodically imparting an additional rotation of an algebraic nature to said train of gearing to index the work spindle.

10. A machine for hardening gears having longitudinally inclined teeth comprising a rotary work spindle, a slide, a heating element mounted on the slide, fluid pressure operated means for reciprocating the slide, a train of gearing for rotating the work spindle in time with the movement of the slide and in proper proportion with said movement and with the inclination of the gear teeth so as to cause the side surface of a tooth of the gear to be presented continuously to the heating element as the heating element moves from one end of the tooth to the other, and fluid pressure operated means for periodically imparting to said train of gearing an additional rotational movement of an algebraic nature to index the work spindle, and means for interlocking the operation of the two fluid pressure operated means.

11. A machine for hardening gears having longitudinally inclined teeth comprising a rotary work spindle, a slide, a heating element mounted on the slide, a train of gearing, including a set of change gears, for reciprocating the slide, a train of gearing, including a set of change gears, for rotating the work spindle in time with the movement of the slide and in proper proportion with said movement and with the inclination of the gear teeth so as to cause the side surface of a tooth of the gear to be presented continuously to the heating element as the heating element moves from one end of the tooth to the other, a single fluid pressure operated means for actuating said two trains of gearing, a train of gearing, including a set of change gears, for periodically imparting an additional rotational movement of an algebraic nature to the second named train of gearing to effect indexing of the work spindle, and fluid pressure operated means for actuating the third named train of gearing in time with the operation of the first named fluid pressure operated means.

12. A machine for hardening gears comprising a rotatable work spindle, a slide, a heating element mounted on the slide, means for reciprocating the slide, a train of gearing, including a set of differential gears, for rotating the work spindle, fluid pressure operated means for actuating said train of gearing, means for locking one element of the set of differential gears against movement while the heating element is in operative relation with the work, fluid pressure operated means for periodically disengaging said locking means and for rotating said differential element, and means for interlocking the two fluid pressure operated means.

13. A machine for hardening gears comprising a heating element, a rotatable work spindle, a train of gearing for rotating the work spindle, means for locking one element of the train against rotation comprising a stop plate, which is operatively connected to said element, and a lock-dog, which is adapted to engage said stop plate, and means for periodically releasing said locking dog comprising a slide, a trip member carried by the slide and adapted to disengage said lock dog from the stop plate, when the slide is moved in one direction, and means operable by the slide in its further movement in said direction for thereafter rotating said stop plate to index the work spindle, and means for periodically moving said slide in the named direction.

14. A machine for hardening gears comprising a heating element, a rotatable work spindle, a train of gearing for rotating the work spindle and including a rotary stop plate, a lock-dog adapted normally to be engaged with the stop plate to hold the stop plate and said train of gearing against rotation, a ratchet member operatively connected to the stop plate, a pawl adapted to engage said ratchet member and to actuate the same, a slide, a trip-member carried by the slide and adapted to disengage said lock-dog from the stop plate when the slide is moved in one direction, means operable by the slide, in its movement in the described direction for thereafter rotating said pawl to cause the stop plate and the train of gearing to be rotated to index the work spindle, and means for periodically moving the slide in the described direction.

15. A machine for hardening gears having longitudinally inclined teeth comprising a rotary work spindle, a slide, a heating element mounted on the slide, a train of gearing, including a set of change gears, for reciprocating the slide, a train of gearing including a set of change gears and a differential, for rotating the work spindle in time with the movement of the slide and in proper proportion with said movement and with the inclination of the gear teeth so as to cause the side surface of a tooth of the gear to be presented continuously to the heating element as the heating element moves from one end of the tooth to the other, a cylinder and a piston reciprocable therein for actuating said two trains of gearing, means for holding one element of the differential against rotation, means for periodically releasing said element of the differential, a train of gearing for rotating said element of the differential, when released, to impart an additional rotation of an algebraic nature to the work spindle to index the work spindle, a cylinder and a piston reciprocable therein for operating said releasing means and rotating the last named train of gearing, separate reversing valves for controlling the direction of application of fluid pressure to the two pistons, and means whereby the movement of one piston controls the operation of the reversing valve that governs the movement of the other piston.

16. A machine for hardening gears comprising a rotatable work spindle, a slide, a heating element mounted on the slide, means for reciprocating the slide to effect movement of the heating element longitudinally of the teeth of a gear, mechanism for periodically indexing the work spindle, and means for automatically controlling the operation of said slide reciprocating means and said indexing mechanism so that the slide is moved in one direction at relatively high speed to preheat a tooth, then the index mechanism is reset, then the slide is moved in the opposite direction at relatively slow speed to harden the tooth, and then the indexing mechanism is actuated to index the work.

17. A machine for hardening gears having longitudinally inclined teeth comprising a rotatable work spindle, a heating element, a slide on which one of said parts is mounted, means for reciprocating the slide to move the heating element from one end of a tooth of a gear to the other, means including a set of change gears for rotating the work spindle in time with the movement of the slide to cause a side surface of the tooth to be presented continuously to the heating element as the heating element moves from one end of the tooth to the other, and means for indexing the work spindle periodically after each reciprocation of the slide.

18. A machine for hardening gears having longitudinally inclined teeth comprising a rotatable work spindle, a heating element, a slide on which one of said parts is mounted, means for reciprocating the slide to move the heating element from one end of a tooth of the gear to the other, means including a set of change gears actuatable on movement of the slide for rotating the work spindle in time with the movement of the slide and in opposite directions, respectively, on opposite directions of movement of the slide so as to cause a tooth of the gear to be presented continuously to the heating element as the heating element moves from one end of the tooth to the other, and means for indexing the work spindle after each reciprocation of the slide.

EDWARD W. BULLOCK.
JOSEPH V. FIDD.